(12) United States Patent
Fukunaga et al.

(10) Patent No.: US 11,025,129 B2
(45) Date of Patent: Jun. 1, 2021

(54) WIRE SUPPORT FOR MOTOR STATOR

(71) Applicant: Nidec Corporation, Kyoto (JP)

(72) Inventors: Keisuke Fukunaga, Kyoto (JP); Takayuki Migita, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 74 days.

(21) Appl. No.: 16/286,654

(22) Filed: Feb. 27, 2019

(65) Prior Publication Data
US 2019/0190344 A1 Jun. 20, 2019

Related U.S. Application Data

(63) Continuation of application No. 14/760,219, filed as application No. PCT/JP2013/084575 on Dec. 25, 2013, now Pat. No. 10,256,694.

(30) Foreign Application Priority Data

Jan. 17, 2013 (JP) .................................. 2013-006284

(51) Int. Cl.
*H02K 5/22* (2006.01)
*H02K 5/16* (2006.01)
(Continued)

(52) U.S. Cl.
CPC .............. *H02K 5/225* (2013.01); *H02K 3/28* (2013.01); *H02K 3/50* (2013.01); *H02K 5/16* (2013.01);
(Continued)

(58) Field of Classification Search
CPC ............ H02K 5/225; H02K 3/28; H02K 3/50; H02K 5/16; H02K 5/15; H02K 5/1732; H02K 2203/09
(Continued)

(56) References Cited

U.S. PATENT DOCUMENTS

| 2004/0027014 A1* | 2/2004 | Weigold .................. H02K 7/14 |
| | | 310/68 R |
| 2006/0138883 A1 | 6/2006 | Yagai et al. |

(Continued)

FOREIGN PATENT DOCUMENTS

| JP | 05-050961 U | 7/1993 |
| JP | 2007-159192 A | 6/2007 |

(Continued)

OTHER PUBLICATIONS

Fukunaga et al., "Bus Bar Structure for a Motor", U.S. Appl. No. 14/760,219, filed Jul. 10, 2015.

*Primary Examiner* — Ahmed Elnakib
(74) *Attorney, Agent, or Firm* — Keating & Bennett (57) ABSTRACT

A motor includes a section with coils, a stator core, a wire support made of resin and fixed to the stator core, a cylindrical portion with a cylindrical shape extending in the axial direction on a radially outer side of the coils, and a top plate portion extending from the cylindrical portion toward an inside of the stationary section in a radial direction. The wire support includes holding portions provided with through holes or notches penetrating in the axial direction. Conducting wires drawn from the coils extend upward through the through holes or the notches. The top plate portion includes top plate holes. The holding portions and the top plate holes are mutually disposed at a position overlapping in the radial direction and the holding portions are within circumferences of the top plate holes when viewed in the axial direction.

12 Claims, 7 Drawing Sheets

(51) Int. Cl.
*H02K 3/50* (2006.01)
*H02K 3/28* (2006.01)
*H02K 5/15* (2006.01)
*H02K 5/173* (2006.01)

(52) U.S. Cl.
CPC ............ *H02K 5/15* (2013.01); *H02K 5/1732* (2013.01); *H02K 2203/09* (2013.01)

(58) Field of Classification Search
USPC ..................................... 310/71, 43
See application file for complete search history.

(56) References Cited

U.S. PATENT DOCUMENTS

| 2007/0001528 | A1* | 1/2007 | Umegaki | H02K 5/10 |
| | | | | 310/88 |
| 2007/0278876 | A1* | 12/2007 | Haga | H02K 3/325 |
| | | | | 310/71 |
| 2007/0296290 | A1* | 12/2007 | Tsukashima | H02K 5/225 |
| | | | | 310/71 |
| 2008/0116755 | A1* | 5/2008 | Sahara | H02K 3/522 |
| | | | | 310/71 |
| 2010/0187924 | A1 | 7/2010 | Yagai et al. | |
| 2010/0327680 | A1* | 12/2010 | Miyachi | H02K 11/024 |
| | | | | 310/71 |
| 2011/0181221 | A1 | 7/2011 | Asahi et al. | |
| 2014/0125173 | A1* | 5/2014 | Hayashi | H02K 3/522 |
| | | | | 310/88 |
| 2015/0357878 | A1* | 12/2015 | Fukunaga | H02K 5/16 |
| | | | | 310/71 |
| 2016/0294240 | A1* | 10/2016 | Kawamoto | H02K 3/522 |
| 2016/0294248 | A1* | 10/2016 | Atarashi | H02K 5/16 |

FOREIGN PATENT DOCUMENTS

| JP | 2008-131720 A | 6/2008 |
| JP | 2008-193889 A | 8/2008 |

* cited by examiner

WIRE SUPPORT FOR MOTOR STATOR

BACKGROUND OF THE INVENTION

1. Field of the Invention

The present invention relates to a motor.

2. Description of the Related Art

Hitherto, a motor having a structure in which a conductive component called a busbar is disposed above a coil, and the coil and an external power source are electrically connected to each other via the component has been known. Typically, the motor includes a plurality of busbars corresponding to each of three phases and a neutral point. In addition, the plurality of busbars are held in a busbar holder made of a resin in a state of being separated from each other. A motor including busbars according to the related art is described in, for example, Japanese Unexamined Patent Application Publication No. 2011-182512, Japanese Unexamined Patent Application Publication No. 2012-29445, and Japanese Unexamined Patent Application Publication No. 2010-154701.

In order to reduce the size of the motor including the busbars in an axial direction, it is preferable that the thickness of the busbar in the axial direction be suppressed. For this, in Japanese Unexamined Patent Application Publication No. 2010-154701, it is described that bus rings are arranged on a same plane such that the thickness of a resin portion made by molding each of the bus rings with a resin is reduced in an axial direction (See Paragraph [0013] of Japanese Unexamined Patent Application Publication No. 2010-154701).

However, in the structure of Japanese Unexamined Patent Application Publication No. 2010-154701, there is concern that the bus ring may be increased in size toward the outside in a radial direction. Therefore, in this structure, it is thought that even though the dimensions in the axial direction are suppressed, it is difficult to simultaneously suppress the dimensions of the entire motor in the radial direction.

SUMMARY OF THE INVENTION

Preferred embodiments of the present invention provide a motor capable of significantly reducing or minimizing the dimensions of the entire motor in a radial direction and reducing a number of busbars stacked in an axial direction by enlarging a busbar portion in the radial direction.

A first exemplary preferred embodiment of the present invention is a motor including a stationary section; and a rotating section which is supported to rotate about a center axis which extends upward and downward. The stationary section includes a plurality of coils, a busbar made of metal, and a busbar holder made of a resin. The plurality of coils are arranged in a circumferential direction. The busbar is positioned above the plurality of coils and is electrically connected to a conducting wire included in the coils. The busbar holder holds the busbar. The rotating section includes a shaft and a rotor. The shaft is disposed along the center axis. The rotor is positioned on an inside of the plurality of coils in a radial direction and is fixed to the shaft. The busbar includes a plate-shaped portion and a plurality of terminals. The plate-shaped portion widens along a plane perpendicular or substantially perpendicular to the center axis. The plurality of terminals extend upward from the plate-shaped portion and are electrically connected to an end portion of the conducting wire. A busbar portion defined by the busbar and the busbar holder and the rotor overlap each other in the axial direction.

According to the first exemplary preferred embodiment of the present invention, compared to a case where the busbar portion and the rotor do not overlap each other in the axial direction, the busbar portion is widened in the radial direction, and the dimensions of the entire motor in the radial direction are significantly reduced or minimized. In addition, because the busbar portion is widened in the radial direction, the number of busbars stacked in the axial direction is able to be reduced. As a result, the dimensions of the motor in the axial direction are significantly reduced or minimized.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, exemplary preferred embodiments of the present invention will be described with reference to the drawings. In addition, in the present application, a direction parallel to the center axis of a motor is referred to as an "axial direction", a direction perpendicular to the center axis of the motor is referred to as a "radial direction", and a direction along the arc about the center axis of the motor is referred to as a "circumferential direction". In addition, in the present application, the shape and positional relationship of each part will be described assuming that the axial direction means the up and down directions and a busbar side with respect to a coil is an upward side. However, when being manufactured and used, the definition of the up and down directions is not intended to limit the directions of the motor according to the present invention.

In addition, the term "parallel" in the following description includes both parallel and substantially parallel directions. In addition, the term "perpendicular" in the following description also includes both perpendicular and substantially perpendicular directions.

Figure 1:
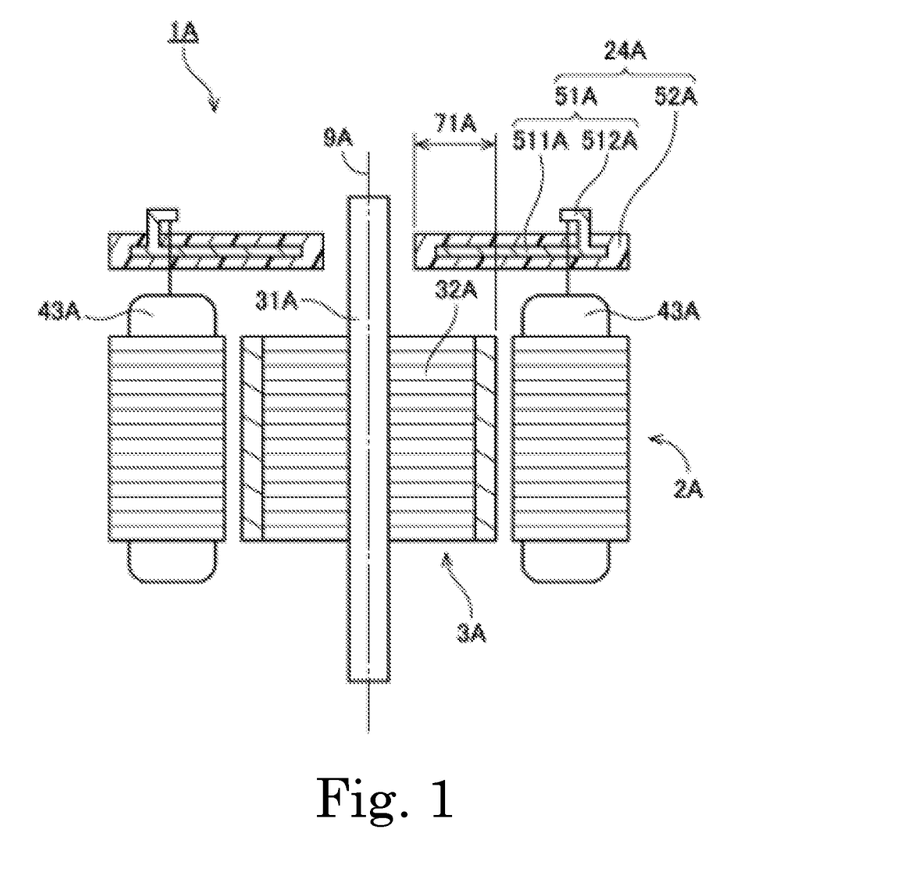
FIG. 1 is a longitudinal sectional view of a motor according to a first preferred embodiment of the present invention.

FIG. 1 is a longitudinal sectional view of a motor 1A according to a first preferred embodiment. As illustrated in FIG. 1, the motor 1A includes a stationary section 2A and a rotating section 3A. The rotating section 3A is supported to rotate about a center axis 9A.

The stationary section 2A preferably includes a plurality of coils 43A, a busbar 51A, and a busbar holder 52A. The plurality of coils 43A are arranged in a circumferential direction. The busbar 51A is made of metal and disposed above the plurality of coils 43A. A conducting wire included in the coil 43A and the busbar 51A are electrically connected to each other. In addition, the busbar 51A is held in the busbar holder 52A, with the busbar holder 52A preferably being made of a resin.

The rotating section 3A includes a shaft 31A and a rotor 32A. The shaft 31A is disposed along the center axis 9A. The rotor 32A is disposed on the inside of the plurality of coils 43A in the radial direction and is fixed to the shaft 31A.

As illustrated in FIG. 1, the busbar 51A preferably includes a plate-shaped portion 511A and a plurality of terminals 512A. The plate-shaped portion 511A widens along the plane that is perpendicular to the center axis 9A. The plurality of terminals 512A extend upward from the plate-shaped portion 511A. An end portion of the conducting wire included in the coils 43A is electrically connected to the plurality of terminals 512A.

Furthermore, in the motor 1A, the busbar portion 24A including the busbar 51A and the busbar holder 52A overlap the rotor 32A in the axial direction in a radial range 71A in FIG. 1. Therefore, as compared to a case where the busbar portion 24A and the rotor 32A do not overlap each other in the axial direction, the busbar portion 24A widens in the radial direction. In addition, since the busbar portion 24A widens toward the inside in the radial direction, the dimensions of the entire motor 1A in the radial direction are significantly reduced or minimized. Because the busbar portion 24A widens in the radial direction, the number of busbars 51A laminated in the axial direction is able to be reduced. As a result, the dimensions of the motor 1A in the axial direction are significantly reduced or minimized.

Figure 2:
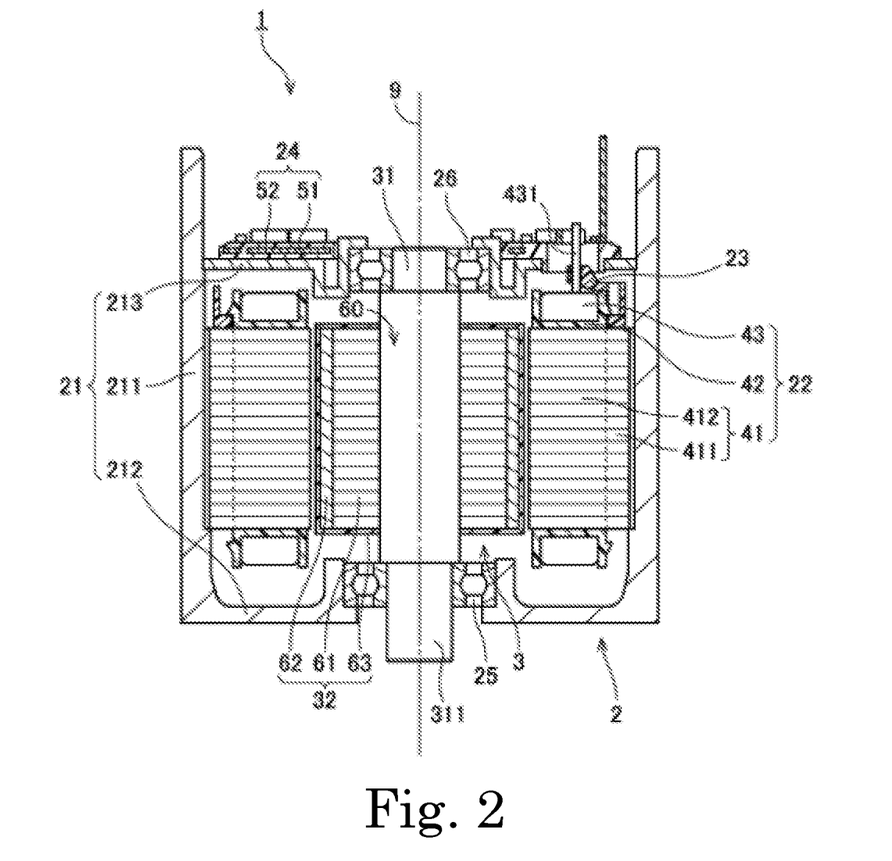
FIG. 2 is a longitudinal sectional view of a motor according to a second preferred embodiment of the present invention.

Subsequently, a second preferred embodiment of the present invention will be described. FIG. 2 is a longitudinal sectional view of a motor 1 according to the second preferred embodiment. The motor 1 of this preferred embodiment is preferably mounted in, for example, a vehicle to be used to generate driving force of power steering. However, the motor of preferred embodiments of the present invention may also be used in applications other than power steering. For example, the motor of preferred embodiments of the present invention may also be used as a driving source of other parts of a vehicle, for example, an engine cooling fan and an oil pump. In addition, the motor of preferred embodiments of the present invention may also be mounted in home appliances, office automation equipment, medical instruments, and the like to generate various types of driving forces.

The motor 1 is a so-called inner rotor type motor in which a rotor 32 is disposed on the inside an armature 22 in a radial direction. As illustrated in FIG. 2, the motor 1 includes a stationary section 2 and a rotating section 3. The stationary section 2 is fixed to the frame body of a device which is a driving object. The rotating section 3 is supported to rotate relative to the stationary section 2.

The stationary section 2 of this preferred embodiment preferably includes a housing 21, the armature 22, a wire support 23, a busbar portion 24, a lower bearing 25, and an upper bearing 26.

The housing 21 preferably includes a cylindrical portion 211, a bottom plate portion 212, and a top plate portion 213. The cylindrical portion 211 extends in a cylindrical or substantially cylindrical shape in the axial direction on the outside of the armature 22 and the wire support 23 in the radial direction. The bottom plate portion 212 widens toward the inside in the radial direction from the cylindrical portion 211 on the lower side of the armature 22. The top plate portion 213 widens toward the inside in the radial direction from the cylindrical portion 211 on the upper side of the wire support 23. The armature 22, the wire support 23, and the rotor 32 which will be described later are accommodated in the internal space of the housing 21.

The cylindrical portion 211, the bottom plate portion 212, and the top plate portion 213 are preferably made of metal such as, for example, aluminum or stainless steel. In this preferred embodiment, the cylindrical portion 211 and the bottom plate portion 212 are provided as a single unitary monolithic member while the top plate portion 213 is provided as a separate member. However, the cylindrical portion 211 and the top plate portion 213 may also be configured as one member while the bottom plate portion 212 is configured as another member.

The armature 22 is disposed on the outside of the rotor 32, which will be described later, in the radial direction. The armature 22 preferably includes a stator core 41, an insulator 42, and a plurality of coils 43. The stator core 41 is preferably defined by laminated steel sheets in which electromagnetic steel sheets are laminated in the axial direction. The stator core 41 includes an annular core-back 411 and a plurality of teeth 412 which protrude inward in the radial direction from the core-back 411. The core-back 411 is disposed coaxially or substantially coaxially with the center axis 9. In addition, the outer circumferential surface of the core-back 411 is fixed to the inner circumferential surface of the cylindrical portion 211 of the housing 21. The plurality of teeth 412 are arranged at equal or substantially equal intervals in the circumferential direction.

The insulator 42 is preferably made of a resin which is an electrically insulating body. The upper surface, the lower surface, and both end surfaces in the circumferential direction of each of the teeth 412 are covered with the insulator 42. The coils 43 are defined by conducting wires wound around the insulator 42. That is, in this preferred embodiment, the conducting wires are wound around the teeth 412 via the insulator 42. The insulator 42 is interposed between the teeth 412 and the coils 43 and thus prevents an electrical short circuit between the teeth 412 and the coils 43.

Instead of the insulator 42, an insulation coating may be performed on the surface of the teeth 412.

The wire support 23 is preferably a member made of a resin, which is fixed to the armature. The wire support 23 prevents a position shift of the conducting wire drawn out from the coils 43 such that the conducting wire is maintained in a state of extending substantially in the axial direction. A detailed structure of the wire support 23 will be described later.

The busbar portion 24 is disposed on the upper portion of the top plate portion 213. The busbar portion 24 preferably includes four busbars 51 made of an electrically conductive metal and a busbar holder 52 made of a resin to hold the busbars 51. The busbars 51 are electrically connected to a conducting wire 431 included in the coils 43. In addition, during the use of the motor 1, a conducting wire that extends from an external power source is connected to the busbars 51. That is, the coils 43 and the external power source are electrically connected to each other via the busbars 51. A detailed structure of the busbar portion 24 will be described later.

The lower bearing 25 and the upper bearing 26 are preferably disposed between the housing 21 and the shaft 31 on the rotating section 3 side. As the lower bearing 25 and the upper bearing 26 of this preferred embodiment, a ball bearing in which the outer race and the inner race rotate relative to each other via spherical bodies is preferably used. Accordingly, the shaft 31 is supported to rotate relative to the housing 21. However, instead of the ball bearings, other types of bearings such as, for example, a slide bearing, a plain bearing, a fluid bearing, etc. may also be used.

The rotating section 3 of this preferred embodiment includes the shaft 31 and the rotor 32.

The shaft 31 is a columnar member that extends along the center axis 9. As the material of the shaft 31, for example, stainless steel is preferably used. The shaft 31 rotates about the center axis 9 while being supported by the lower bearing 25 and the upper bearing 26 described above. In addition, a lower end portion 311 of the shaft 31 protrudes downward from the bottom plate portion 212. The lower end portion 311 of the shaft 31 is connected to an apparatus which is a driving object, via a power transmission mechanism such as a gear.

The rotor 32 is positioned on the inside of the armature 22 in the radial direction and rotates along with the shaft 31. The rotor 32 preferably includes a rotor core 61, a plurality of magnets 62, and a resin portion 63. The rotor core 61 is preferably defined by laminated steel sheets in which electromagnetic steel sheets are laminated in the axial direction. At the center of the rotor core 61, an insertion hole 60 that extends in the axial direction is provided. The shaft 31 is press-fitted into the insertion hole 60 of the rotor core 61. Accordingly, the rotor core 61 and the shaft 31 are fixed to each other.

The plurality of magnets 62 preferably are fixed to the outer circumferential surface of the rotor core 61 by, for example, an adhesive. The surface of each of the magnets 62 on the outside in the radial direction acts as a magnetic pole surface which opposes the end surface of the teeth 412 on the inside in the radial direction. The plurality of magnets 62 are arranged in the circumferential direction so that the N poles and the S poles are alternately arranged. Otherwise, instead of the plurality of magnets 62, a single annular magnet in which the N poles and S poles are alternately magnetized in the circumferential direction may also be used.

The resin portion 63 covers both end surfaces of the rotor core 61 and the plurality of magnets 62 in the axial direction and the surface of the magnets 62 on the outside in the radial direction. Accordingly, the magnets 62 are prevented from protruding upward, downward, and outward in the radial direction. In addition, the rigidity of the entire rotor 32 is increased by the resin portion 63.

When an electrical driving current is applied to the coils 43 via the busbars 51 from the external power source, a magnetic flux is generated in the plurality of teeth 412 of the stator core 41. In addition, a torque in the circumferential direction is generated by the action of the magnetic flux between the teeth 412 and the magnets 62. As a result, the rotating section 3 rotates about the center axis 9 relative to the stationary section 2.

Figure 3:
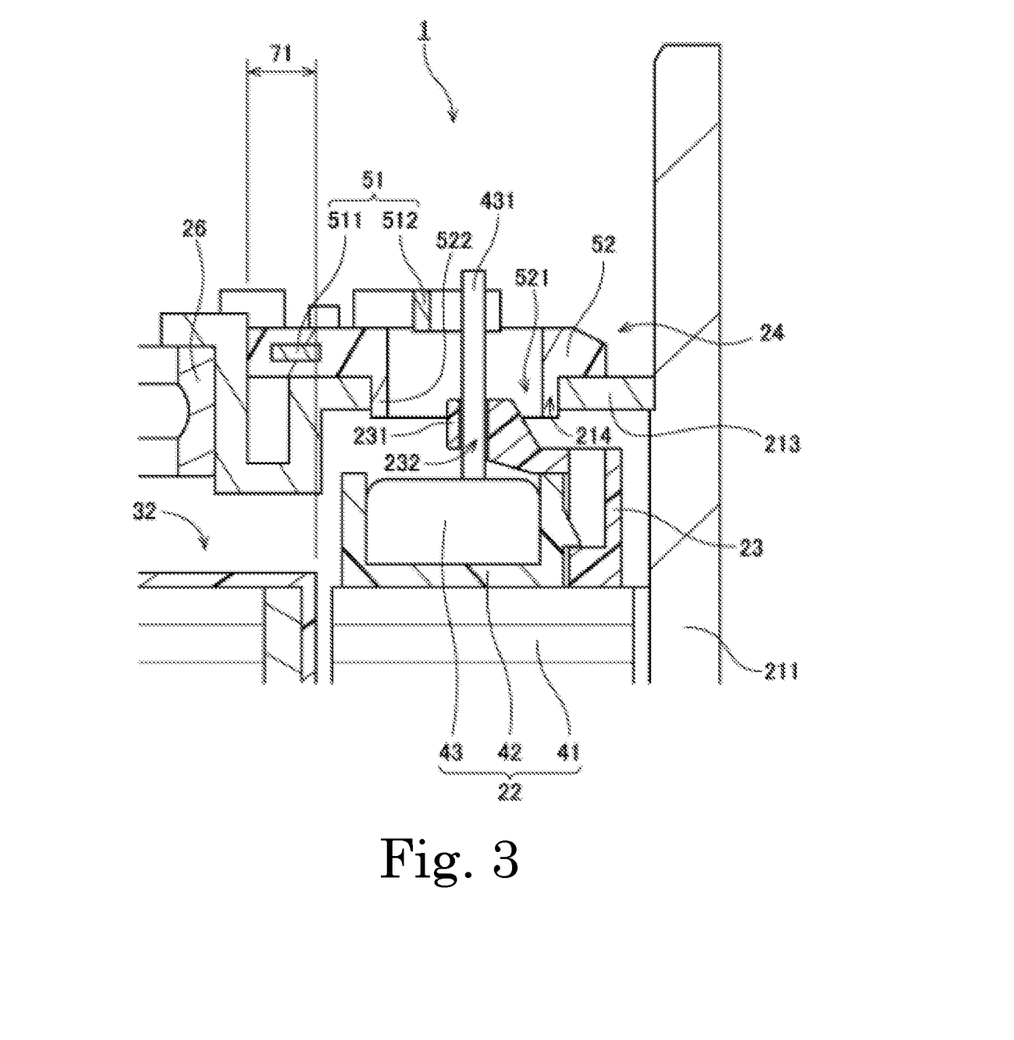
FIG. 3 is a partial longitudinal sectional view of the motor according to the second preferred embodiment of the present invention.

Subsequently, detailed structures of the wire support 23 and the busbar portion 24 described above will be described. FIG. 3 is a partial longitudinal sectional view of the motor 1.

As illustrated in FIGS. 2 and 3, the wire support 23 is disposed on the upper side of the stator core 41. The wire support 23 may be directly fixed to the stator core 41 or may be fixed to the stator core 41 via another member. In this preferred embodiment, the insulator 42, the stator core 41, and the wire support 23 are preferably fixed to each other by a snap-fit in which the claw portions thereof are hooked to each other.

The wire support 23 includes a plurality of holding portions 231. The plurality of holding portions 231 are preferably positioned on the axial upper side of the coils 43. In addition, at least a portion of each of the holding portions 231 is disposed on the lower side of the top plate portion 213. Each of the holding portions 231 is provided with a cut-out 232 which penetrates therethrough in the axial direction. However, instead of the cut-out 232, each of the holding portions 231 may alternatively be provided with a through-hole which penetrates therethrough in the axial direction. The conducting wire 431 drawn out from the coils 43 extends upward through the cut-out 232 of the holding portion 231. As such, since the conducting wire 431 is allowed to pass through the cut-out 232 of the holding portion 231, a position shift of the conducting wire 431 is prevented. As a result, the conducting wire 431 is maintained in a state of extending in or substantially in the axial direction.

The motor 1 of this preferred embodiment preferably is a three-phase synchronous motor. Therefore, a plurality of conducting wires 431 corresponding to the U phase, the V phase, the W phase, and the neutral point are drawn from the plurality of coils 43. In a manufacturing process of the motor 1, before mounting the top plate portion 213 and the busbar portion 24, the plurality of conducting wires 431 are preferably allowed to pass through the cut-outs 232 of the holding portions 231 in advance. In this case, the position of the upper end portion of the conducting wire 431 becomes stable. Therefore, when the top plate portion 213 and the busbar portion 24 are mounted, an operation of inserting the plurality of conducting wires 431 into holes provided in the top plate portion 213 and the busbar portion 24 is facilitated.

Particularly, in this preferred embodiment, the insulator 42 and the wire support 23 are separate members. Therefore, in a case of forming the coils 43, the conducting wires can be wound around the insulator 42 in a state where the wire support 23 is absent. Accordingly, an operation of winding the conducting wires is facilitated. However, the insulator 42 and the wire support 23 may also be made of a single resin member. In this case, there is an advantage in that the number of components of the motor 1 can be reduced.

The busbar portion 24 includes the four busbars 51 made of metal and the busbar holder 52 made of a resin. The busbar holder 52 is an insert molded product molded by using the top plate portion 213 and the four busbars 51 as insert components. That is, in a case of molding the busbar holder 52, the top plate portion 213 and the four busbars 51 are disposed in a mold for injection molding in advance. In addition, a resin is poured into the mold and the resin is allowed to solidify such that the busbar holder 52 is molded.

During the insert molding, molding of the busbar holder 52 and fixing of the top plate portion 213, the four busbars 51, and the busbar holder 52 are simultaneously performed. In addition, the resin for molding the busbar holder 52 comes into close contact with the upper surface of the top plate portion 213. Accordingly, vibration of the top plate portion 213 is significantly reduced or prevented. As a result, noise during the driving of the motor 1 is significantly reduced or prevented.

Here, during the molding of the busbar holder 52, the top plate portion 213 may be excluded from the insert components. That is, the busbar holder 52 is preferably molded by using only the four busbars 51 as the insert components, and the obtained busbar portion 24 may be fixed to the top plate portion 213. In this case, the top plate portion 213 and the busbar holder 52 may be fixed to each other by, for example, welding.

Figure 4:
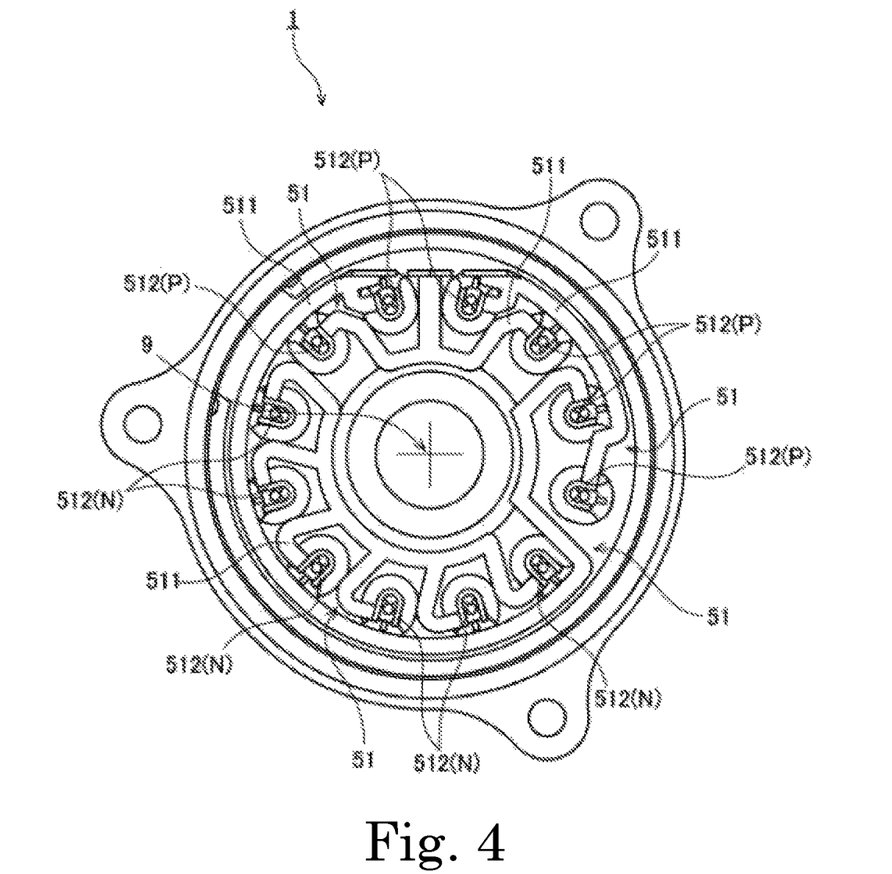
FIG. 4 is a top view of the motor according to the second preferred embodiment of the present invention.

FIG. 4 is a top view of the motor 1. Here, in FIG. 4, in order to clearly illustrate the shape of the busbar 51, the illustration of the busbar holder 52 is omitted. As illustrated in FIG. 4, the four busbars 51 are arranged in an annular shape as a whole around the center axis 9. The four busbars 51 are maintained in a state of being separated from each other by the busbar holder 52. The busbars 51 are respectively electrically connected to the coils 43 corresponding to the U phase, the V phase, and the W phase and a neutral point N, which will be described later.

As illustrated in FIGS. 3 and 4, each of the busbars 51 preferably includes a plate-shaped portion 511 and a plurality of terminals 512. The plate-shaped portion 511 widens along a single plane perpendicular to the center axis 9. The plurality of terminals 512 extends upward from each of the plate-shaped portion 511. In addition, the plurality of terminals 512 are arranged along the single plane perpendicular to the center axis 9. In addition, each of the plate-shaped portion 511 and the plurality of terminals 512 may be arranged in a substantially planar configuration as a whole. Therefore, for example, the plate-shaped portion 511 and the plurality of terminals 512 may include portions that locally protrude in the axial direction.

The top plate portion 213 is provided with a plurality of top plate holes 214 which penetrate therethrough in the axial direction. In addition, the busbar holder 52 is provided with a plurality of holder holes 521 which penetrate therethrough in the axial direction. The holding portion 231 of the wire support 23, the top plate hole 214, and the holder hole 521 are disposed at a position at which the holding portion 231, the top plate hole 214, and the holder hole 521 overlap each other in the axial direction in a plan view.

The conducting wire 431 is drawn out from the coils 43 to pass through the cut-out 232 of the holding portion 231, the top plate hole 214, and the holder hole 521 and extend in the axial direction. In addition, on the upper side of the upper surface of the busbar holder 52, the end portion of the conducting wire 431 and the terminal 512 are electrically connected to each other. The connection between the terminal 512 and the conducting wire 431 is preferably achieved by, for example, plastically deforming the terminal 512 to allow the conducting wire 431 to be interposed therebetween and welding the conducting wire 431 to the terminal 512.

In the motor 1, the busbar portion 24 and the rotor 32 overlap each other in the axial direction in a radial range 71 in FIG. 3. Therefore, as compared to a case where the busbar portion 24 and the rotor 32 do not overlap each other in the axial direction, the busbar portion 24 preferably widens in the radial direction. In addition, since the busbar portion 24 widens toward the inside in the radial direction, the dimensions of the entire motor 1 in the radial direction are significantly reduced or prevented. Because the busbar portion 24 widens in the radial direction, the number of busbars 51 stacked in the axial direction is able to be reduced. As a result, in this preferred embodiment, the number of busbars 51 laminated in the axial direction is only 1. Accordingly, the dimensions of the motor 1 in the axial direction are significantly reduced or minimized.

In the manufacturing process of the motor, when the armature 22, the rotor 32, the top plate portion 213, and the busbar portion 24 are assembled, first, the rotor 32 is disposed on the inside of the armature 22 in the radial direction. The rotor 32 is then inserted into the inside of the armature 22 in the radial direction in a downward direction from a position above the armature 22. Thereafter, the top plate portion 213 and the busbar portion 24 are disposed on the upper side of the armature 22 and the rotor 32.

In addition, in this preferred embodiment, the upper bearing 26 is preferably interposed between the top plate portion 213 and the shaft 31. Moreover, the busbar portion 24 and the upper bearing 26 overlap each other in the radial direction. Accordingly, overall dimensions of the busbar portion 24 and the upper bearing 26 in the axial direction are significantly reduced or minimized. As a result, the dimensions of the motor 1 in the axial direction are further reduced or minimized.

In addition, as illustrated in FIG. 3, the busbar holder 52 in this preferred embodiment preferably includes a plurality of holder projections 522 which protrude downward. Each of the holder projections 522 protrudes toward the inside of the top plate hole 214. In addition, the plurality of holder holes 521 respectively pass through the plurality of holder projections 522 in the axial direction. In this case, the cylindrical holder projection 522 is interposed between the edge of the top plate hole 214 and the holder hole 521. Accordingly, contact between the conducting wire 431 and the edge of the top plate hole 214 is preferably significantly reduced or prevented. Therefore, electrical conduction between the conducting wire 431 and the top plate portion 213 is significantly reduced or prevented.

In addition, in this preferred embodiment of the present invention, in a plan view, the holder hole 521 is preferably smaller than the top plate hole 214. When the holder hole 521 is smaller than the top plate hole 214, even though the above-described holder projection 522 is absent, contact between the conducting wire 431 and the edge of the top plate hole 214 is significantly reduced or prevented. Therefore, electrical conduction between the conducting wire 431 and the top plate portion 213 significantly reduced or prevented.

Figure 5:
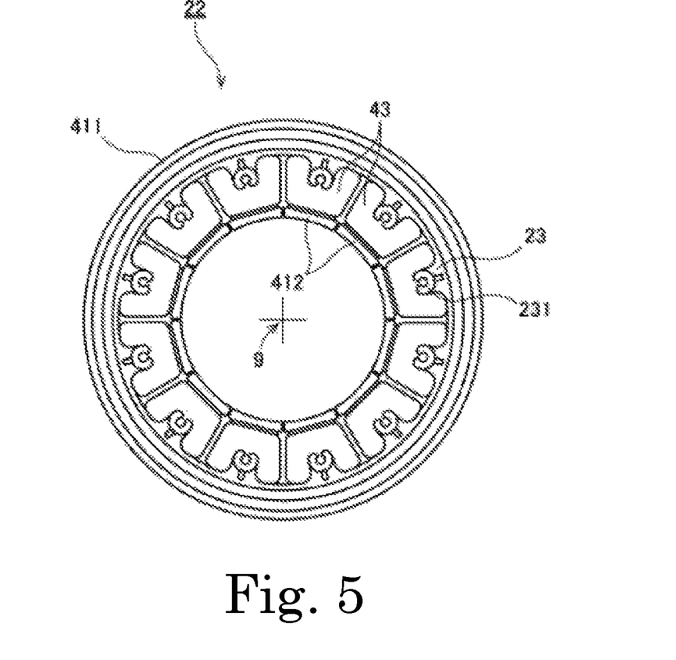
FIG. 5 is a top view of an armature according to the second preferred embodiment of the present invention.
Figure 6:
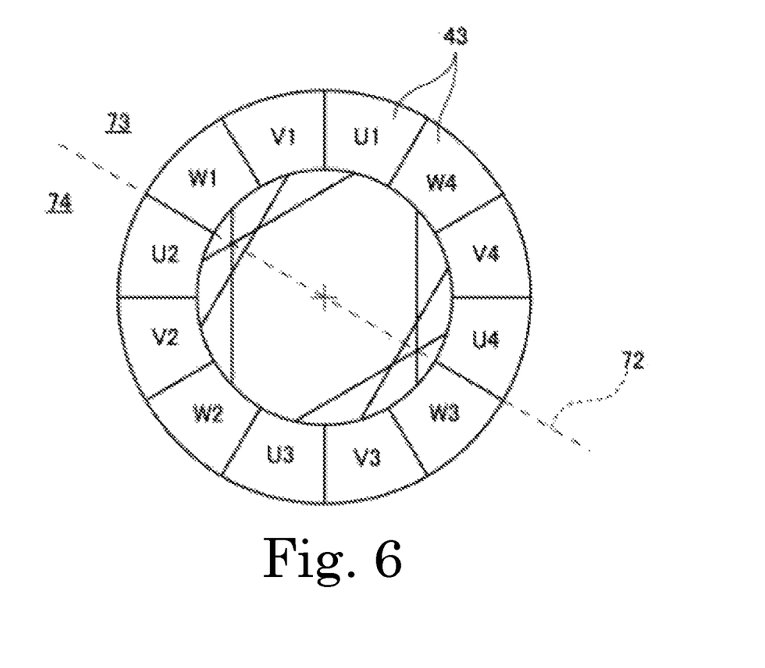
FIG. 6 is a view illustrating a connection configuration of coils according to the second preferred embodiment of the present invention.
Figure 7:
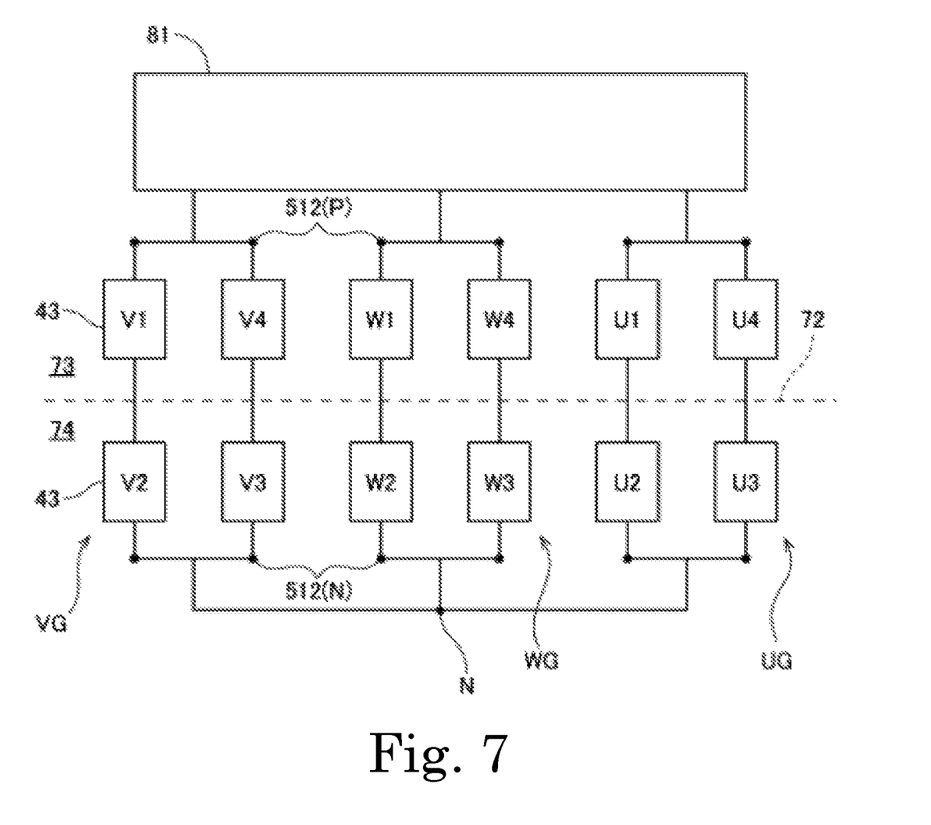
FIG. 7 is a view illustrating the connection configuration of the coils according to the second preferred embodiment of the present invention.

FIG. 5 is a top view of the armature 22. FIGS. 6 and 7 are views which schematically illustrate a configuration in which the conducting wires included in the coils 43 are connected. As illustrated in FIGS. 5 and 6, the armature 22 of this preferred embodiment includes twelve coils 43. The twelve coils 43 include four U-phase coils 43 (U1 to U4), four V-phase coils 43 (V1 to V4), and four W-phase coils 43 (W1 to W4). The coils 43 are arranged in the circumferential direction in order of U1, V1, W1, U2, V2, W2, U3, V3, W3, U4, V4, and W4.

As conceptually illustrated in FIG. 6, in this preferred embodiment, each of six groups of coil pairs of U1 and U2, U3 and U4, V1 and V2, V3 and V4, W1 and W2, and W3 and W4 is defined by a single continuous conducting wire. That is, as illustrated in FIG. 7, each of the six groups of coil pairs is connected in series. In addition, the coil pair of U1 and U2 and the coil pair of U3 and U4 are connected in parallel to define a U-phase coil group UG. In addition, the coil pair of V1 and V2 and the coil pair of V3 and V4 are connected in parallel to define a V-phase coil group VG. In addition, the coil pair of W1 and W2 and the coil pair of W3 and W4 are connected in parallel to define a W-phase coil group WG.

In addition, first end portions of the U-phase coil group UG, the V-phase coil group VG, and the W-phase coil group WG are electrically connected to a circuit board 81 preferably including a microcontroller. In addition, the other end portions of the U-phase coil group UG, the V-phase coil group VG, and the W-phase coil group WG are electrically connected to the neutral point N. That is, in this preferred embodiment, the U-phase coil group UG, the V-phase coil group VG, and the W-phase coil group WG are connected in a Y connection.

As illustrated in FIG. 4, the plurality of terminals 512 of the busbar 51 preferably include six phase terminals 512(P) and six neutral point terminals 512(N). The end portion of the conducting wire 431 corresponding to each phase of the U phase, the V phase, and the W phase is connected to the six phase terminals 512(P). That is, as illustrated in FIG. 7, the circuit board 81 and six coil pairs are electrically connected to each other via the six phase terminals 512(U, V, W). In addition, the end portion of the conducting wire 431 extending from the neutral point N is connected to the six neutral point terminals 512(N). That is, the neutral point N and six coil pairs are electrically connected to each other via the six neutral point terminals 512(N).

In addition, as illustrated in FIGS. 6 and 7, in this preferred embodiment, in a first space 73 partitioned by a plane 72 including the center axis 9, first coils 43 (U1, V1, W1, U4, V4, W4) of the coil pairs are arranged. All the coils 43 (U1, V1, W1, U4, V4, W4) are coils connected to the circuit board 81 side. In addition, in this preferred embodiment, in the other space 74 partitioned by the above-mentioned plane 72, the other coils 43 (U2, V2, W2, U3, U3, U3) of the coil pairs are arranged. All the coils 43 (U2, V2, W2, U3, U4, U5) are coils connected to the neutral point N side.

When the plurality of coils 43 are arranged as described above, the six neutral point terminals 512(N) are able to be densely arranged in the other space 74 described above. Specifically, as in FIG. 4, the six neutral point terminals 512(N) preferably are continuously arranged in the circumferential direction so as not to cause the phase terminals 512(P) to be interposed between the neutral point terminals 512(N). In this case, the plurality of phase terminals 512(P) are efficiently arranged in the first space 73 described above. As a result, the dimensions of the busbar portion 24 in the radial direction are further significantly reduced or minimized. As described above, when the four busbars 51 are efficiently arranged, the number of busbars 51 overlapping in the radial direction can be allowed to be three or less. For example, in the example of FIG. 4, the number of busbars 51 overlapping in the radial direction is two or less. Accordingly, the dimensions of the busbar portion 24 in the radial direction are further significantly reduced or minimized.

In addition, in the connection configuration of FIG. 7, when the V-phase coil group VG and the W-phase coil group WG are switched to each other and are connected to the circuit board 81, the rotation direction of the rotor 32 is reversed. In addition, furthermore, when first coils 43 (U1, V1, W1, U4, V4, W4) of each of the coil pairs and the other coils 43 (U2, V2, W2, U3, U3, U3) are switched and are connected, the rotation direction of the rotor is further reversed and is thus returned to its forward direction. As described above, when the connection configuration of FIG. 7 is used, the rotor is rotated in the same direction by switches of the U, V, and W phases without changing a conduction pattern for the armature 22.

While the exemplary preferred embodiments of the present invention have been described above, the present invention is not limited thereto.

Figure 8:
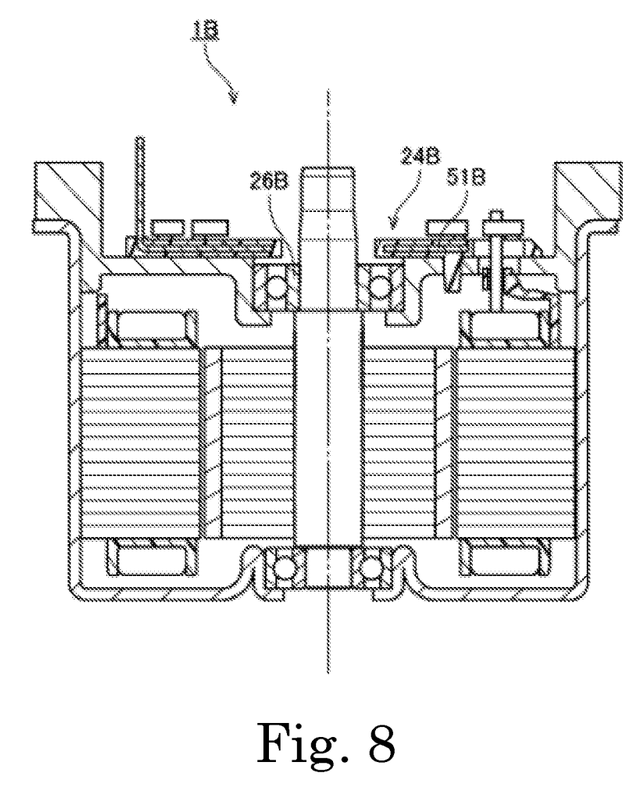
FIG. 8 is a longitudinal sectional view of a motor according to a modification example of a preferred embodiment of the present invention.

FIG. 8 is a longitudinal sectional view of a motor 1B according to a modification example of a preferred embodiment of the present invention. In the example of FIG. 8, a busbar portion 24B and an upper bearing 26B overlap each other in the axial direction. In this case, the busbar portion 24B can be provided to widen in the radial direction. Therefore, the number of busbars 51B laminated in the axial direction is more easily reduced.

In addition, a busbar portion may also be disposed on the lower side of a top plate portion. That is, the busbar portion may also be disposed inside a housing. However, when the busbar portion 24 is disposed on the upper side of the top plate portion 213 as in the above-described preferred embodiment, the top plate portion 213 does not need to be provided with holes through which the plurality of terminals 512 pass. Furthermore, each of the terminals 512 of the busbar 51 is able to be reduced in length in the axial direction.

In addition, in the preferred embodiments of the present invention, although the number of busbars stacked in the axial direction is able to be reduced, the number of busbars stacked in the axial direction is not necessarily 1. For example, in a busbar portion, a plurality of busbars may be arranged in multiple stages in the axial direction.

Additionally, the detailed shape of each member may also be different from the shape illustrated in each diagram of the present application. In addition, the elements that are described in the preferred embodiments or the modified example described above may be appropriately combined in a range that does not cause contradictions.

In addition, when "to facilitate an operation of assembling another member to a conducting wire drawn out from coils and an operation of connecting the conducting wire" is desired, a preferred embodiment of the present invention in which a "busbar portion" is not the requirement and instead of this, a "wire support" which is similar to the above-described busbar portion may be extracted from the above-described preferred embodiments. This preferred embodiment of the present invention is, for example, a "motor including a stationary section and a rotating section which is supported to rotate about a center axis which extends upward and downward, in which the stationary section includes a stator core including a plurality of teeth arranged in a circumferential direction, a plurality of coils including a conducting wire wound around the teeth, and a wire support made of a resin, which is fixed to the stator core directly or via another member, the wire support includes a plurality of holding portions provided with through-holes or cut-outs which penetrate through the holding portions in an axial direction, and the conducting wire drawn out from the coils passes through the through-hole or the cut-out and extends upward".

According to this preferred embodiment of the present invention, the conducting wire is maintained in a state of extending substantially in the axial direction. Accordingly, the operation of assembling another member or connecting the conducting wire is facilitated. In addition, the elements described above in the preferred embodiments of the modification example may be combined with this preferred embodiment of the present invention.

Preferred embodiments of the present invention may be used for a motor.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor comprising:
    a stationary section; and
    a rotating section rotatably supported about a center axis extending in an axial direction; wherein
    the stationary section includes:
        coils arranged in a circumferential direction;
        a stator core with teeth, the coils being wound around the teeth;
        a wire support made of resin and fixed to the stator core either directly or via another member;
        a cylindrical portion with a cylindrical shape extending in the axial direction on a radially outer side of the coils; and
        a top plate portion extending from the cylindrical portion toward an inside of the stationary section in a radial direction;
    the wire support includes holding portions provided with through holes or notches penetrating in the axial direction; and
    conducting wires are drawn from the coils and extend upward through the through holes or the notches; and
    the top plate portion includes top plate holes; and
    the holding portions and the top plate holes overlap in the radial direction and the holding portions are within circumferences of the top plate holes when viewed in the axial direction.

2. The motor according to claim 1, wherein the stationary section further includes a resin insulator interposed between the teeth and the coils, and the resin insulator and the wire support are separate members.

3. The motor according to claim 2, wherein the insulator and the wire support are fixed by a snap fit in which claw portions of the resin insulator and the wire support are hooked together.

4. The motor according to claim 1, wherein the stationary section further includes a resin insulator interposed between the teeth and the coils, and the resin insulator and the wire support are defined by a single resin member.

5. The motor according to claim 1, wherein
    the stationary portion includes a busbar made of metal electrically connected to a conductor defining the coils and a busbar holder made of resin holding the busbar;
    the busbar holder includes holder holes; and
    the holding portion and the holder holes overlap in the axial direction in a plan view.

6. The motor according to claim 1, wherein the stationary portion includes:
    a cylindrical portion with a cylindrical shape extending in the axial direction on the radially outer side of the coils;
    a top plate portion that extends from the cylindrical portion radially inward;
    a busbar made of a metal electrically connected to the conducting wire defining the coils; and
    a resin busbar holder that holds the busbar;
    the busbar holder is made of a resin material and includes holder holes;
    the top plate hole and the holder holes overlap each other in the axial direction in a plan view.

7. The motor according to claim 1, wherein the stationary portion includes:
    a cylindrical portion with a cylindrical shape extending in the axial direction on the radially outer side of the coils;
    a top plate portion that extends from the cylindrical portion radially inward;
    a busbar made of a metal electrically connected to the conducting wire defining the coils; and
    a resin busbar holder that holds the busbar;
    the busbar holder is made of a resin material;
    holder holes, the holding portions, and the top plate holes overlap each other in the axial direction in a plan view.

8. The motor according to claim 1, wherein
    the top plate portion holds a bearing; and
    a busbar assembly including a busbar and a busbar holder is disposed below the top plate portion.

9. The motor according to claim 1, wherein the top plate portion holds a bearing, and a busbar assembly including a busbar and a busbar holder is disposed on an upper side of the top plate portion.

10. The motor according to claim 1, wherein
    the holding portion is located below a top of the top plate portion; and
    the holding portion and the top plate portion overlap each other in the axial direction in a plan view.

11. The motor according to claim 1, wherein the holding portion and the coils overlap each other in the axial direction in a plan view.

12. The motor according to claim 1, wherein
    the stationary section includes an insulator made of a resin and interposed between the teeth and the coils; and
    the holding portions are located above the insulator and below the top plate portion.

* * * * *